(12) United States Patent
Daimaru et al.

(10) Patent No.: US 11,654,969 B2
(45) Date of Patent: May 23, 2023

(54) VEHICLE BODYSIDE STRUCTURE

(71) Applicant: SUBARU CORPORATION, Tokyo (JP)

(72) Inventors: Shohei Daimaru, Tokyo (JP); Ryosuke Shimada, Tokyo (JP); Toshiaki Ogiwara, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 0 days.

(21) Appl. No.: 17/487,915

(22) Filed: Sep. 28, 2021

(65) Prior Publication Data

US 2022/0105986 A1 Apr. 7, 2022

(30) Foreign Application Priority Data

Oct. 1, 2020 (JP) .............................. JP2020-167235

(51) Int. Cl.
*B62D 21/15* (2006.01)
*B62D 25/02* (2006.01)

(52) U.S. Cl.
CPC ......... *B62D 21/157* (2013.01); *B62D 25/025* (2013.01)

(58) Field of Classification Search
CPC ...... B62D 25/025; B62D 25/04; B62D 21/15; B62D 21/157
USPC ................................ 296/209, 29, 30, 193.06
See application file for complete search history.

(56) References Cited

U.S. PATENT DOCUMENTS

| 11,124,245 | B2* | 9/2021 | Grottke ............... | B62D 21/157 |
| 2015/0008703 | A1 | 1/2015 | Furusaki et al. | |
| 2016/0221609 | A1 | 8/2016 | Furusaki et al. | |
| 2016/0272248 | A1 | 9/2016 | Furusaki et al. | |

FOREIGN PATENT DOCUMENTS

| DE | 102016205136 A1 * | 10/2017 | ........... B62D 25/025 |
| JP | 2013-166435 A | 8/2013 | |
| KR | 101766749 B1 * | 8/2017 | ........... B62D 25/025 |
| WO | WO 2013/121890 A1 | 8/2013 | |

OTHER PUBLICATIONS

Translation KR101766749 (Year: 2017).*
Translation dE102016205136 (Year: 2017).*

* cited by examiner

*Primary Examiner* — Dennis H Redder
(74) *Attorney, Agent, or Firm* — McGinn I.P. Law Group, PLLC.

(57) ABSTRACT

A vehicle bodyside structure to be applied to a vehicle includes a side sill, a first reinforce, a second reinforce, and a third reinforce. The side sill is disposed on a rear side of a front tire of the vehicle. The side sill extends along a vehicle fore-and-aft direction. The first reinforce is disposed in a front end side of the side sill. The first reinforce includes a front portion and a rear portion. The front portion extends from an inner side to an outer side in a vehicle width direction. The rear portion extends along the vehicle fore-and-aft direction. The second reinforce at least partly overlaps the rear portion of the first reinforce. The third reinforce is disposed on a rear side of the first reinforce. The second reinforce overlaps a vicinity of a rear end of the rear portion of the first reinforce.

20 Claims, 7 Drawing Sheets

VEHICLE BODYSIDE STRUCTURE

CROSS-REFERENCE TO RELATED APPLICATIONS

The present application claims priority from Japanese Patent Application No. 2020-167235 filed on Oct. 1, 2020, the entire contents of which are hereby incorporated by reference.

BACKGROUND

The disclosure relates to vehicle bodyside structures and, in particular, relates to a vehicle bodyside structure provided with due considerations for safety when a small-overlap frontal collision occurs.

As a vehicle crash, there is a small-overlap frontal collision. The small-overlap frontal collision is a micro-lap collision with a low offset rate. Consequently, when the small-overlap frontal collision occurs, a high-strength disk of a wheel abuts against a side sill and deforms a front side of a vehicle cabin to such a large degree that safety of an occupant may be damaged.

In view of this, Japanese Unexamined Patent Application Publication (JP-A) No. 2013-166435 and International Patent Application Publication WO 2013/121890 A1 disclose techniques to prevent deformation of the side sill upon occurrence of the small-overlap frontal collision.

JP-A No. 2013-166435 discloses a technique of deforming the wheel by collapsing the side sill and a jack-up reinforcing plate when the small-overlap frontal collision occurs.

WO 2013/121890 A1 discloses that a slide-shaped gusset is formed in front of the side sill. With this configuration, when the small-overlap frontal collision occurs, the wheel is displaced along the gusset and released outward in a width direction so as to prevent the wheel from intruding into the vehicle cabin.

SUMMARY

According to an aspect of the disclosure provides a vehicle bodyside structure to be applied to a vehicle. The vehicle bodyside structure includes a side sill, a first reinforce, a second reinforce, and a third reinforce. The side sill is disposed on a rear side of a front tire of the vehicle. The side sill extends along a vehicle fore-and-aft direction. The first reinforce is disposed in a front end side of the side sill. The first reinforce includes a front portion and a rear portion. The front portion extends from an inner side to an outer side in a vehicle width direction. The rear portion extends along the vehicle fore-and-aft direction. The second reinforce at least partly overlaps the rear portion of the first reinforce. The third reinforce is disposed on a rear side of the first reinforce. The second reinforce overlaps a vicinity of a rear end of the rear portion of the first reinforce.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to explain the principles of the disclosure.

FIG. 2A is a perspective view of the vehicle including the vehicle bodyside structure, and FIG. 2B is a cut-away perspective view of a side sill.

FIG. 3A is a cross-sectional view of the side sill as viewed from above. FIG. 3B is a cross-sectional view of a second reinforce and an A-pillar as viewed from above. FIG. 3C is a perspective view of the vehicle bodyside structure embodied.

FIG. 7A illustrates a deformation situation of the side sill, and FIG. 7B illustrates a deformation situation of the second reinforce.

DETAILED DESCRIPTION

Figure 1:
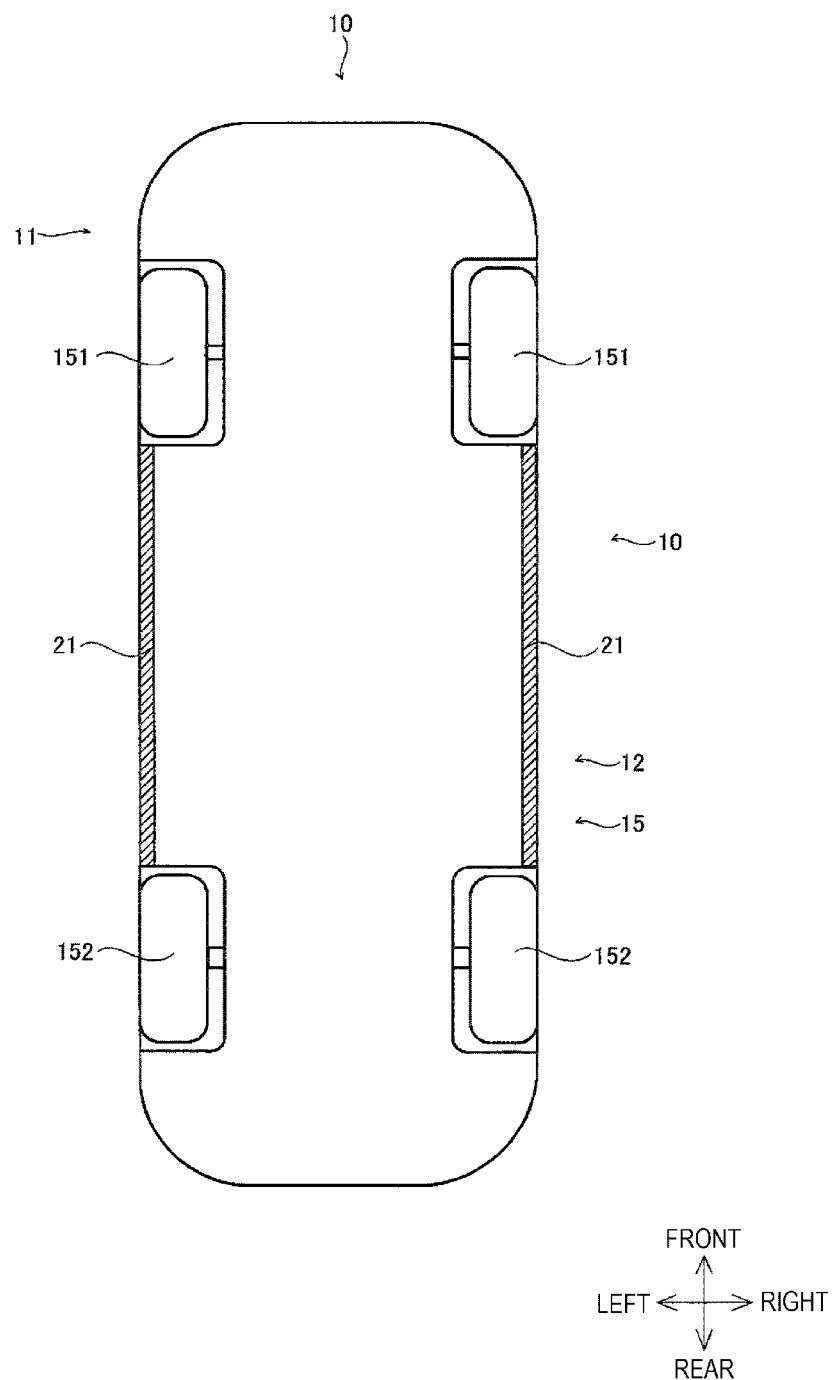
FIG. 1 is a plan view of a vehicle including a vehicle bodyside structure according to an embodiment of the disclosure.

In the above-described techniques disclosed in JP-A No. 2013-166435 and WO 2013/121890 A1, there is still room for improvement in view of, for example, securing safety upon occurrence of a small-overlap frontal collision.

In the technique disclosed in JP-A No. 2013-166435, when the small-overlap frontal collision causes a large impact, reaction of the side sill and the jack-up reinforcing plate may not deform the wheel enough to stop the wheel from intruding into the vehicle cabin.

In the technique disclosed in WO 2013/121890 A1, the gusset that does not have a sufficient strength is considered to make it difficult to slide the wheel out of the vehicle when the small-overlap frontal collision occurs. Moreover, the gusset formed in front of the side sill may suppress a volume of the vehicle cabin.

It is desirable to provide a vehicle bodyside structure that makes it possible to more reliably prevent a wheel from intruding into a vehicle cabin upon occurrence of a small-overlap frontal collision.

Hereinafter, a vehicle bodyside structure 11 according to an embodiment of the disclosure will be detailed with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description. In the following description, "front", "rear", "upper", "lower", "left", and "right" will be used to indicate directions, and "left" and "right" will refer to the left and right when a vehicle 10 is viewed from a rear side. Furthermore, in the following description, in principle, the same components are denoted by identical reference numerals and signs and will not be elaborated repeatedly.

FIG. 1 is a plan view of the vehicle 10 including the vehicle bodyside structure 11.

The vehicle 10 includes a vehicle body 12, and tires are attached to the vehicle body 12. In this configuration, front tires 151 are disposed on a front side of the vehicle body 12 whereas rear tires 152 are disposed on a rear side of the vehicle body 12.

Side sills 21 are formed on end portions of the vehicle body 12 in a vehicle width direction. Each of the side sills 21 is a substantially columnar member extending in a fore-and-aft direction and has a high strength to secure rigidity of the vehicle body 12.

Figure 2A:
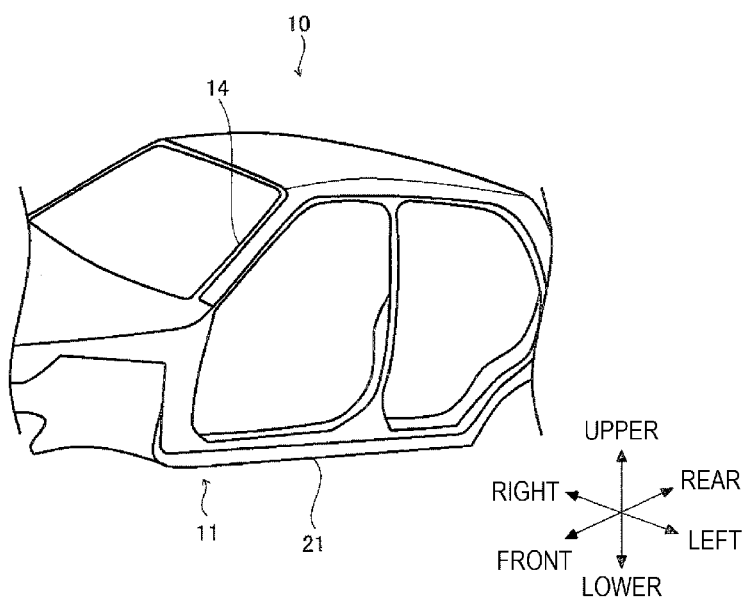
FIGS. 2A and 2B illustrate the vehicle bodyside structure according to the embodiment of the disclosure.
Figure 2B:
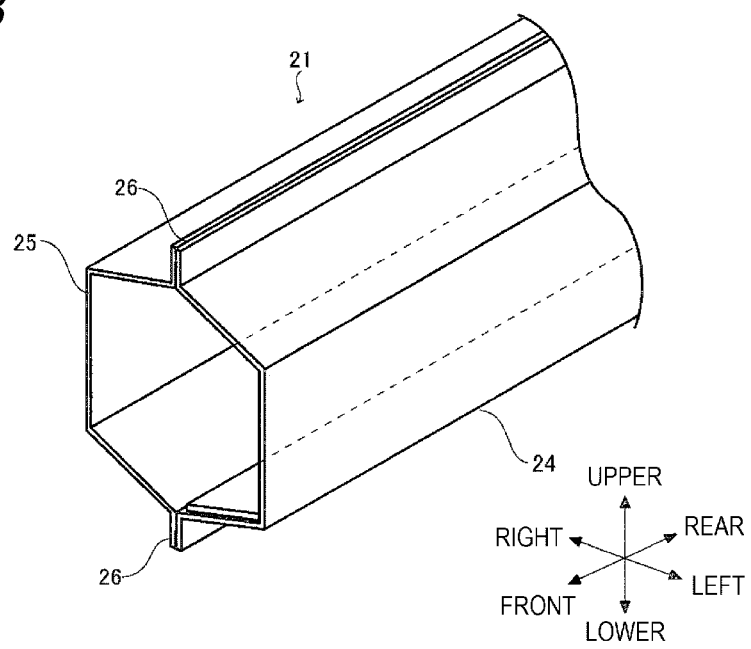

FIGS. 2A and 2B illustrate the vehicle bodyside structure 11. FIG. 2A is a perspective view of the vehicle 10 including the vehicle bodyside structure 11, and FIG. 2B is a cut-away perspective view of the side sill 21.

Referring to FIG. 2A, the vehicle bodyside structure 11 is disposed in a front end portion of the side sill 21. The vehicle bodyside structure 11 is disposed in the vicinity of a lower side of an A-pillar 14. As described later, a portion of the vehicle bodyside structure 11 is made of an A-pillar reinforcing member 28 to reinforce a lower end of the A-pillar 14.

Referring to FIG. 2B, the side sill 21 includes a side sill outer 24, a side sill inner 25, and connections 26 where the side sill outer 24 and the side sill inner 25 are connected with each other. The vehicle bodyside structure 11, described later, is formed inside the side sill 21. Each of the connections 26 is a portion where the side sill outer 24 and the side sill inner 25 are bonded in a plane-to-plane manner, and is also referred to as a butted flange.

Figure 3A:
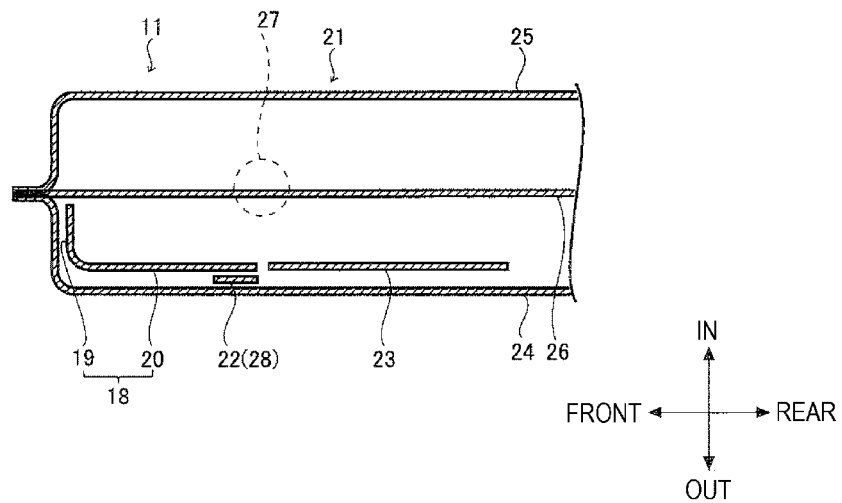
FIGS. 3A to 3C illustrate the vehicle bodyside structure according to the embodiment of the disclosure.
Figure 3B:
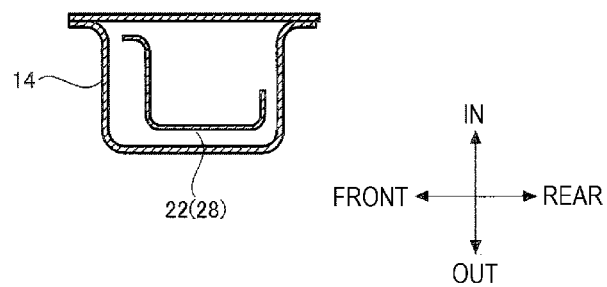
Figure 3C:
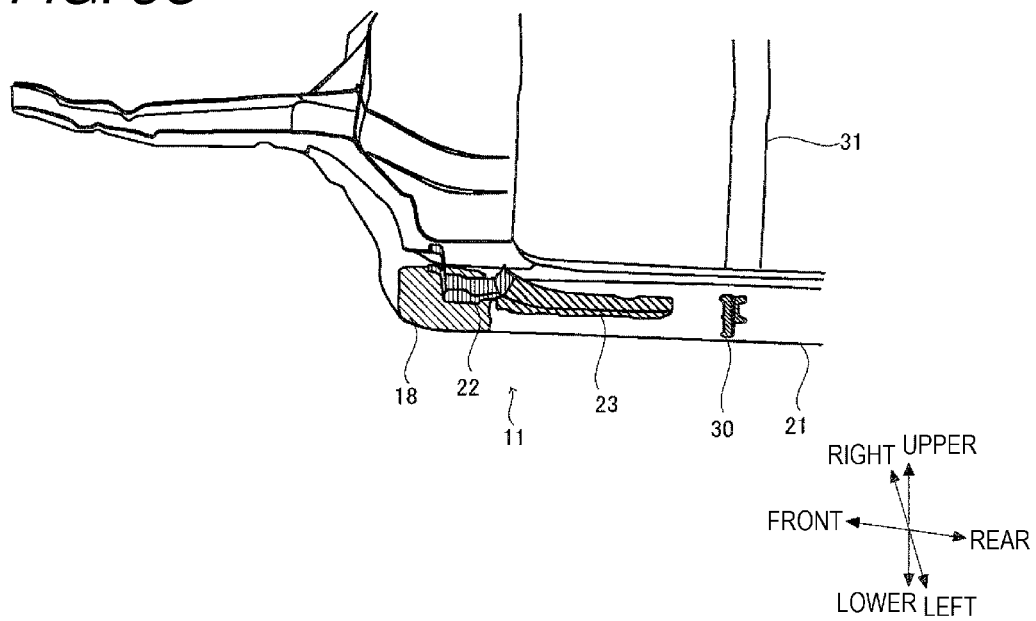

FIGS. 3A, 3B, and 3C illustrate the vehicle bodyside structure 11. FIG. 3A is a cross-sectional view of the side sill 21 as viewed from above. FIG. 3B is a cross-sectional view of a second reinforce 22 and the A-pillar 14 as viewed from above. FIG. 3C is a perspective view of the vehicle bodyside structure 11 embodied.

Referring to FIG. 3A, the vehicle bodyside structure 11 is disposed in the front end portion of the side sill 21.

The vehicle bodyside structure 11 includes a first reinforce 18, the second reinforce 22, and a third reinforce 23. The first reinforce 18, the second reinforce 22, and the third reinforce 23 are made of steel plates having predetermined shapes. With the vehicle bodyside structure 11, as described later, when the small-overlap frontal collision occurs, the wheel can be displaced and released outward in the vehicle width direction and prevented from intruding into the vehicle cabin.

The first reinforce 18 includes a front portion 19 and a rear portion 20. The front portion 19 is disposed on a front end side of the side sill 21 and extends from an inner side to an outer side in the vehicle width direction. The rear portion 20 extends along the vehicle fore-and-aft direction. In a plan view, the first reinforce 18 substantially has an L-shape.

The front portion 19 of the first reinforce 18 is disposed in a front end portion of the side sill 21 so as to reinforce the front end portion of the side sill 21. Consequently, when the small-overlap frontal collision occurs, the front end portion of the side sill 21 can crack the wheel so as to prevent the wheel from intruding into the vehicle cabin. Moreover, when the small-overlap frontal collision occurs, the first reinforce 18 as a whole provides an inclined plane inclined rearward and outward in the vehicle width direction. With this configuration, the wheel can be displaced and released outside along the inclined plane made of the first reinforce 18.

In the fore-and-aft direction, the second reinforce 22 at least partly overlaps the rear portion 20 of the first reinforce 18. Alternatively, in the fore-and-aft direction, the whole second reinforce 22 overlaps a rear end portion of the first reinforce 18. The second reinforce 22 is disposed outside the rear portion 20 of the first reinforce 18 in the vehicle width direction. The second reinforce 22 is part of the A-pillar reinforcing member 28. When the small-overlap frontal collision occurs, the second reinforce 22 generates a moment to incline, for example, the rear portion 20 of the first reinforce 18 outwards in the vehicle width direction.

The third reinforce 23 is disposed on a rear side of the first reinforce 18. A front end portion of the third reinforce 23 is disposed on a rear side of a rear end portion of the first reinforce 18. In this configuration, a gap may be formed between the rear end portion of the first reinforce 18 and the front end portion of the third reinforce 23. When the small-overlap frontal collision occurs, the third reinforce 23 supports from behind the rear portion 20 of the first reinforce 18 inclined and the second reinforce 22. Furthermore, the third reinforce 23 is disposed on the rear side of the first reinforce 18 and the second reinforce 22 so that when the small-overlap frontal collision occurs, the first reinforce 18 and the second reinforce 22 can be swung outward in the vehicle width direction.

The connections 26 are partly made fragile to form fragile portions 27. The fragile portion 27 are disposed between the rear end portion of the first reinforce 18 and the front end portion of the third reinforce 23 or in the vicinity therebetween in the fore-and-aft direction. The fragile portions 27 may be formed by adopting methods such as decreasing frequency of spot welding, reducing a welding diameter of spot welding, and partly forming no connections 26. The fragile portions 27 are formed in such a manner that when the small-overlap frontal collision occurs, the connections 26 can be ruptured from the fragile portions 27 so as to deform the side sill outer 24 outward in the vehicle width direction.

The above-described components have different strengths to incline the first reinforce 18, the second reinforce 22, and the front end portion of the third reinforce 23 when the small-overlap frontal collision occurs.

In one example, the side sill inner 25 has such a high strength that when the small-overlap frontal collision occurs, the side sill inner 25 can support the side sill 21 as a whole. The side sill outer 24 has such a low strength that when the small-overlap frontal collision occurs, the side sill outer 24 can be easily deformed outward in the vehicle width direction. The first reinforce 18 has such an intermediate strength that when the small-overlap frontal collision occurs, the first reinforce 18 can be easily deformed into an inclined shape. The second reinforce 22 has a high strength, that is, a higher strength than the third reinforce 23 so that when the small-overlap frontal collision occurs, a large moment can be generated. The third reinforce 23 has such an intermediate strength or such a high strength that when the small-overlap frontal collision occurs, the first reinforce 18 can be steadfastly supported from behind.

The components can be increased in strength as described above by adopting methods such as increasing plate thicknesses, using high-strength materials, and forming ribs.

Referring to FIG. 3B, the second reinforce 22 is formed inside the A-pillar 14. As described above, the second reinforce 22 also serves as the A-pillar reinforcing member 28.

Referring to FIG. 3C, the first reinforce 18, the second reinforce 22, and the third reinforce 23 are plate-shaped members disposed inside the side sill 21. A separator 30 is disposed on a rear side of the third reinforce 23. The separator 30 is disposed inside the side sill 21 so as to increase the strength of the side sill 21. A cross member 31 is coupled to an intermediate portion of the side sill 21 and the separator 30. With this configuration, when the small-overlap frontal collision occurs, the separator 30 can support the third reinforce 23 in the fore-and-aft direction.

Figure 4:
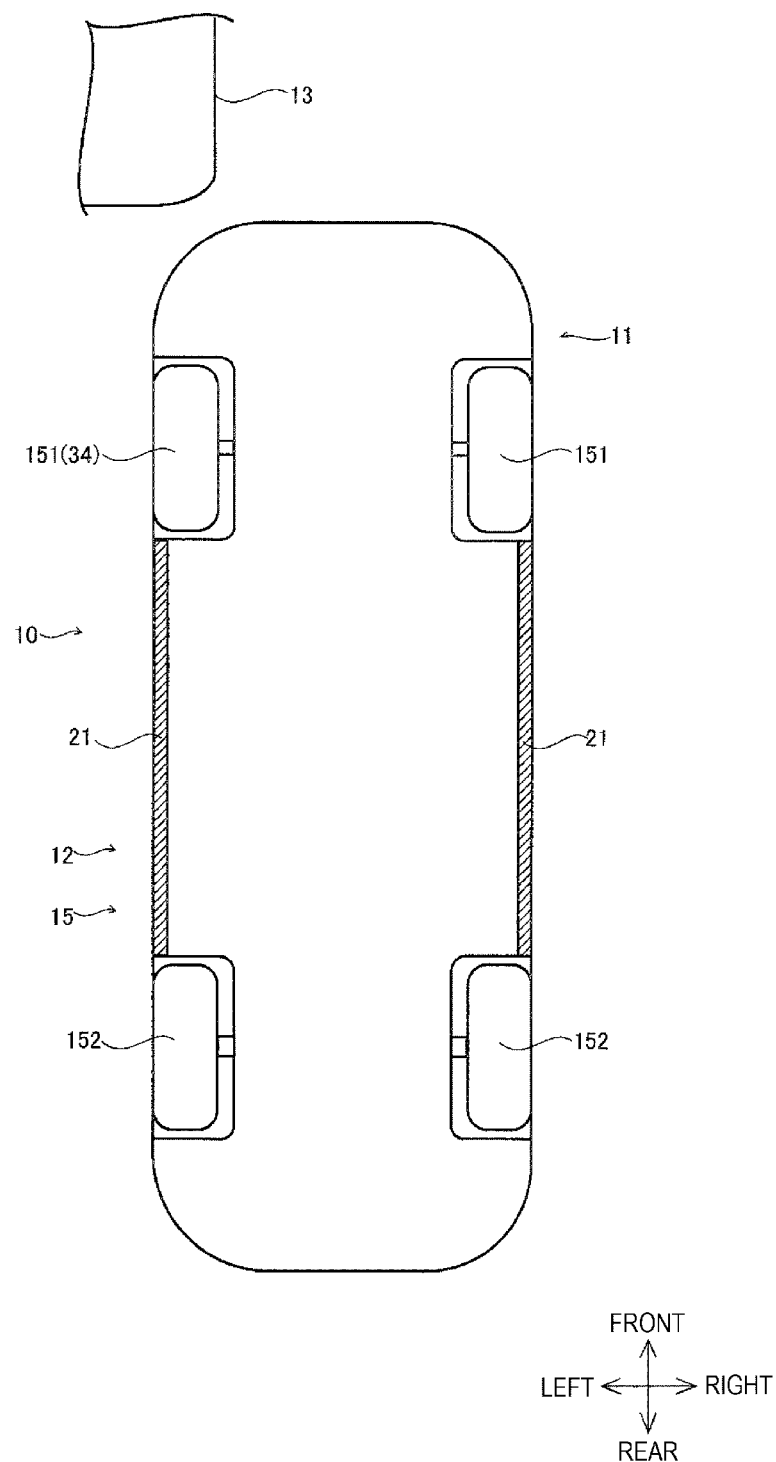
FIG. 4 is a plan view of the vehicle including the vehicle bodyside structure according to the embodiment of the disclosure, illustrating a situation where the vehicle is about to cause a small-overlap frontal collision.

FIG. 4 is a plan view of the vehicle 10 including the vehicle bodyside structure 11, illustrating a situation where the vehicle 10 is about to cause the small-overlap frontal collision.

In this view, a left side of a front end portion of the vehicle 10 is causing the small-overlap frontal collision with a collision object 13. Therefore, unless any measures are taken, a wheel 34 of the front tire 151 may intrude into the vehicle cabin. In this embodiment, as described later, a function of the vehicle bodyside structure 11 prevents the wheel 34 from intruding into the vehicle cabin.

Figure 5A:
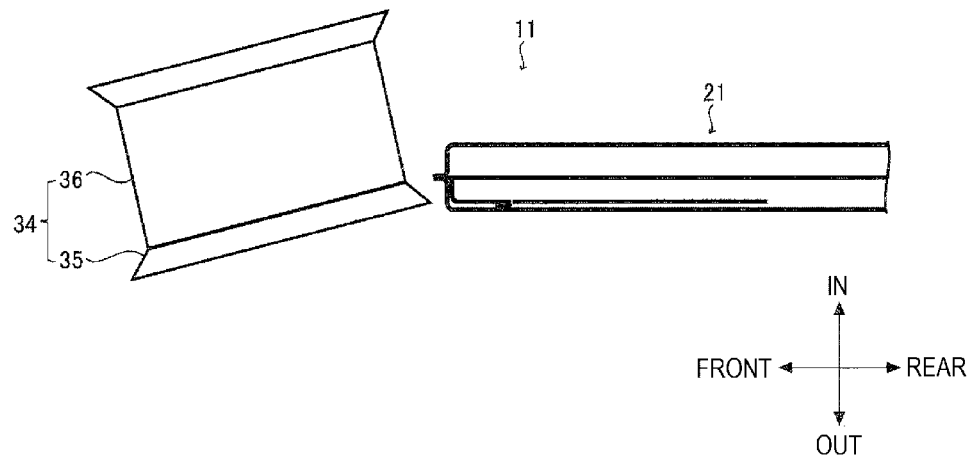
FIGS. 5A to 5C illustrate the vehicle bodyside structure according to the embodiment of the disclosure and are diagrams illustrating a situation where a wheel is separated and collapsed when the small-overlap frontal collision occurs.
Figure 5B:
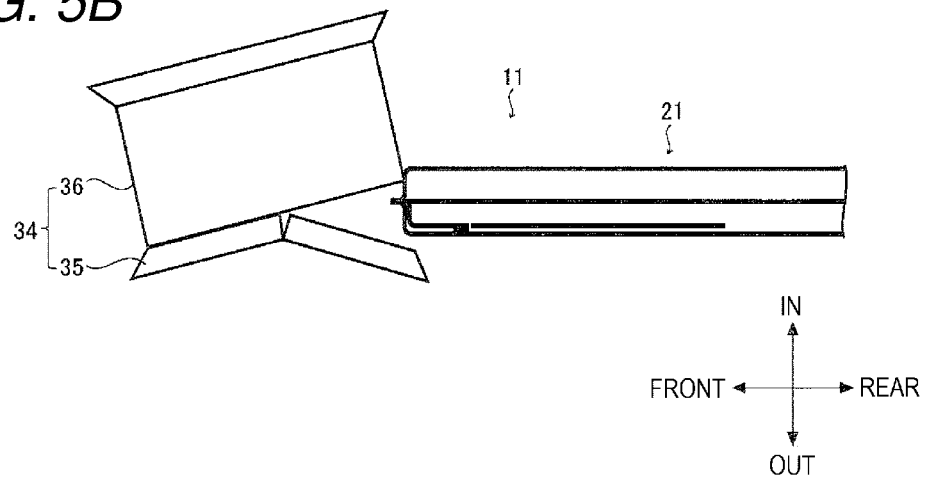
Figure 5C:
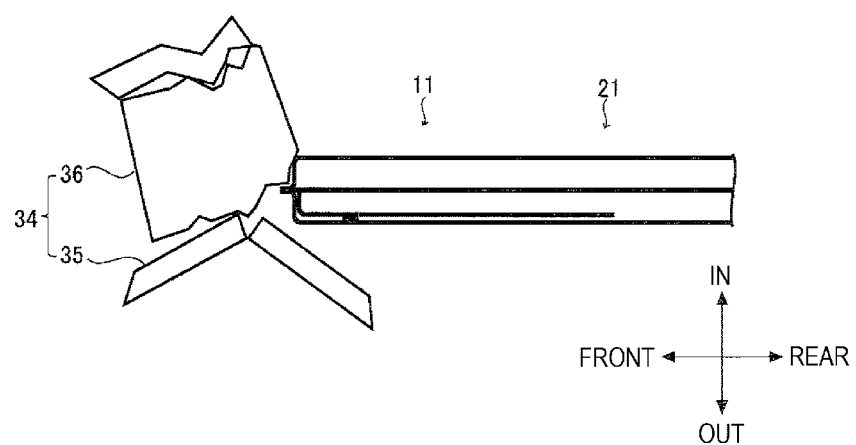

FIGS. 5A, 5B, and 5C are diagrams illustrating a situation where the wheel 34 is separated and collapsed when the small-overlap frontal collision occurs.

Referring to FIG. 5A, the wheel 34 includes a wheel inner member 36 and a wheel outer member 35 formed outside the wheel inner member 36 in a width direction. In this configuration, the wheel inner member 36 includes, for example, a rim and an inner flange of the wheel 34. The wheel outer member 35 includes, for example, spokes and an outer peripheral surface of a rim of the wheel 34. In this view, however, a tire attached to the wheel 34 is not illustrated.

When the small-overlap frontal collision occurs, a rear end portion of the wheel 34 abuts against the front end portion of the side sill 21. In this case, the vicinity of a boundary between the wheel inner member 36 and the wheel outer member 35 collides against the front end of the side sill 21.

Referring to FIG. 5B, the front end portion of the side sill 21 is reinforced by the first reinforce 18 (see FIG. 3A). In the wheel 34, the boundary portion between the wheel inner member 36 and the wheel outer member 35 is made relatively fragile. Therefore, the wheel 34 that has collided with the front end of the side sill 21 is separated from the boundary portion between the wheel inner member 36 and the wheel outer member 35. In this case, a rear portion of the wheel outer member 35 is separated from the wheel inner member 36 and faces outward in the width direction.

Referring to FIG. 5C, when the small-overlap frontal collision further proceeds, the wheel inner member 36 having a low strength is collapsed in front of the front end of the side sill 21, that is, inside a wheelhouse, not illustrated in this drawing. This prevents the wheel 34 from intruding into the vehicle cabin. Moreover, because the rear end portion of the wheel outer member 35 is separated from the wheel inner member 36, the rear end portion of the wheel outer member 35 is pressed out of the vehicle and prevented from intruding into the vehicle cabin.

Figure 6A:
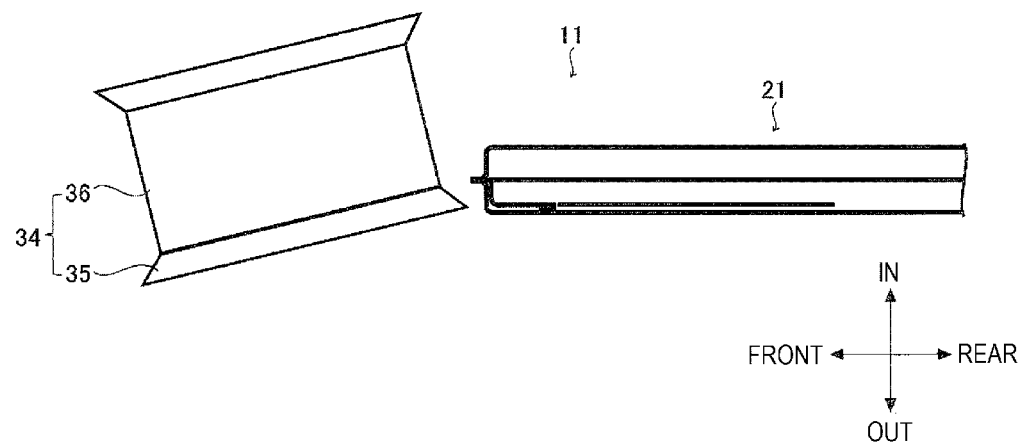
FIGS. 6A to 6C illustrate the vehicle bodyside structure according to the embodiment of the disclosure and are diagrams illustrating another situation where the wheel is separated and collapsed when the small-overlap frontal collision occurs.
Figure 6B:
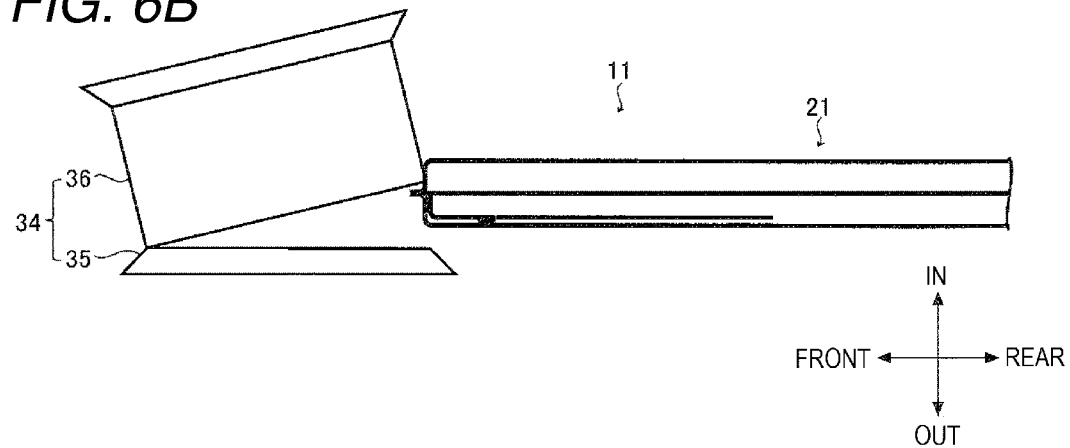
Figure 6C:
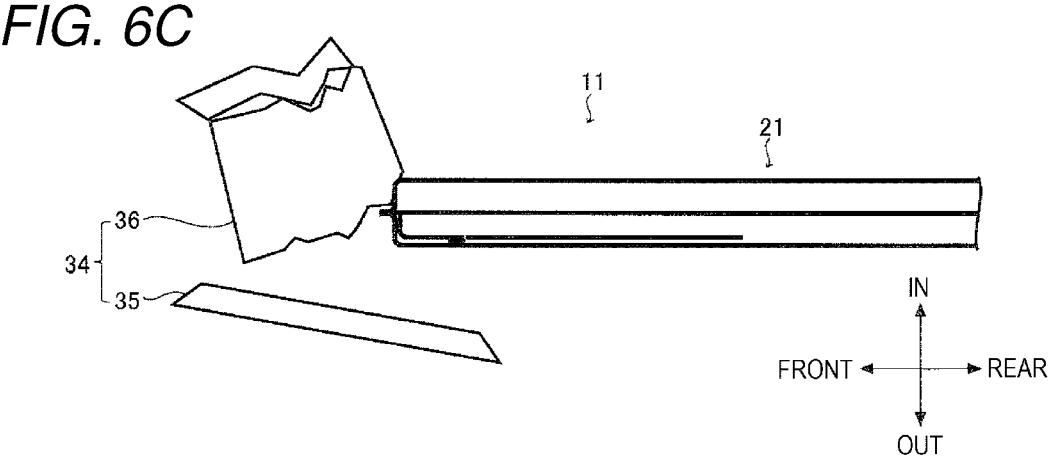

FIGS. 6A, 6B, and 6C are diagrams illustrating another situation where the wheel 34 is separated and collapsed when the small-overlap frontal collision occurs.

Referring to FIGS. 6A and 6B, in this case, during occurrence of the small-overlap frontal collision, when the wheel 34 collides with the front end of the side sill 21, the wheel outer member 35 is wholly separated from the wheel inner member 36. Therefore, as illustrated in FIG. 6C, during the small-overlap frontal collision, the whole wheel outer member 35 is separated from the wheel inner member 36 so that the whole wheel outer member 35 is pressed out of the vehicle and prevented from intruding into the vehicle cabin.

Figure 7A:
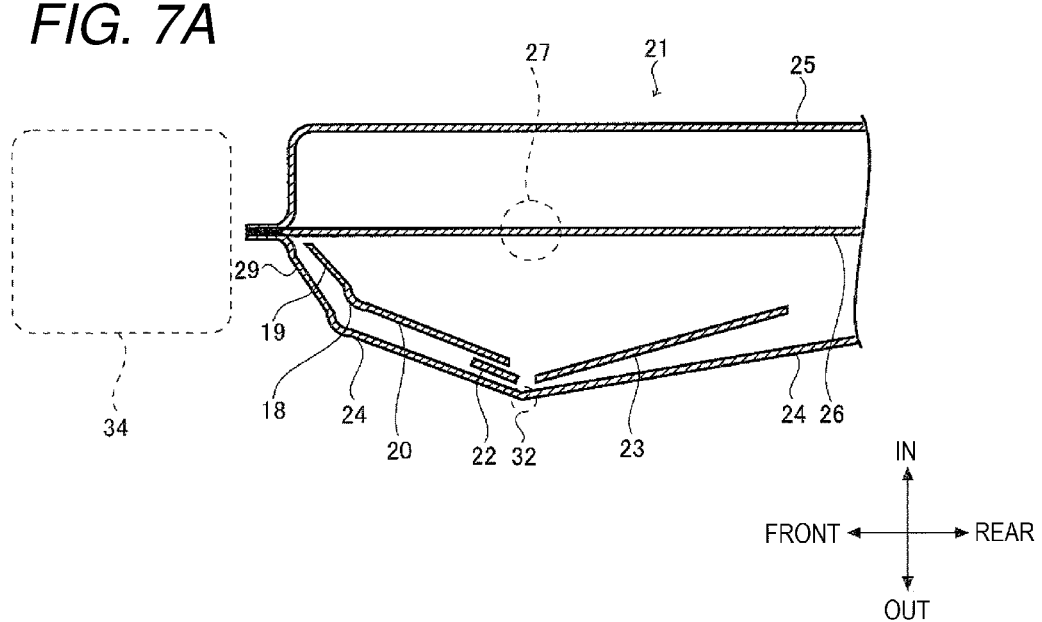
FIGS. 7A and 7B are diagrams illustrating a situation where the vehicle including the vehicle bodyside structure according to the embodiment of the disclosure is causing the small-overlap frontal collision.
Figure 7B:
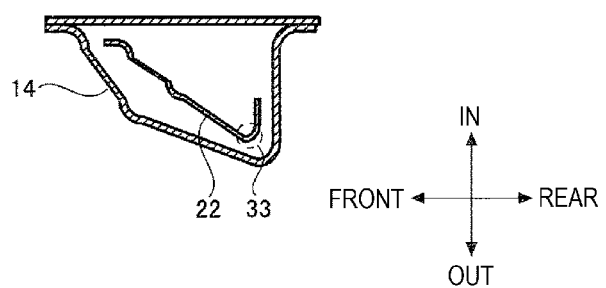

FIGS. 7A and 7B are diagrams illustrating a situation where the vehicle 10 including the vehicle bodyside structure 11 is causing the small-overlap frontal collision. FIG. 7A illustrates a deformation situation of the side sill 21, and FIG. 7B illustrates a deformation situation of the second reinforce 22.

Referring to FIG. 7A, when the small-overlap frontal collision occurs, the side sill 21 starts deforming from the fragile portions 27 due to an impact that the wheel 34 exerts on a contact portion 29, which is the front end of the side sill 21. In one example, since separation of the connections 26 starts from the fragile portions 27, the side sill inner 25 having a high strength maintains a straight-line shape whereas the side sill outer 24 having a low strength is deformed outward in the vehicle width direction.

Referring to FIG. 7B, due to an impact when the small-overlap frontal collision occurs, the A-pillar 14 and the second reinforce 22 disposed inside the A-pillar 14 are also deformed. In particular, a support 33 of the second reinforce 22 is displaced outward in the vehicle width direction.

Since the support 33 of the second reinforce 22 becomes a pinned support, a moment is generated to move outward the second reinforce 22 illustrated in FIG. 7A. Thus, the side sill outer 24 is deformed to expand outward about a bending point 32 as a center. Consequently, the whole first reinforce 18 provides an inclined plane inclined rearward and outward in the vehicle width direction. Also, the front end portion of the side sill outer 24 provides an inclined plane inclined rearward and outward in the vehicle width direction. The rear portion 20 and the second reinforce 22 are supported from behind by the third reinforce 23.

With this configuration, the wheel 34 is displaced outward in the vehicle width direction while guided along the inclined planes provided by the front end portion of the side sill outer 24 and the first reinforce 18. In other words, the front end portion of the third reinforce 23 and the first reinforce 18 function as a slide to move the wheel 34 outward in the vehicle width direction. Consequently, when the small-overlap frontal collision occurs, the wheel 34 can be prevented from intruding into the vehicle cabin.

The above-described embodiment can produce the following primary effects.

According to this embodiment, the first reinforce 18 is disposed in the front end side of the side sill 21 so that when the small-overlap frontal collision occurs, the front end of the side sill 21 that is reinforced by the first reinforce 18 comes into contact with the wheel 34 and cracks the wheel 34, thereby preventing the wheel 34 from intruding into the vehicle cabin. Furthermore, the rear portion 20 of the first reinforce 18 overlaps the second reinforce 22 so that when the small-overlap frontal collision occurs, the second reinforce 22 generates the moment to bend the first reinforce 18 outwards. Thus, the portion of the side sill outer 24 where the first reinforce 18 is disposed is provided as an inclined plane, and the wheel 34 is slid along this inclined plane so that the wheel 34 can be prevented from intruding into the vehicle cabin. Moreover, because the third reinforce 23 is disposed on the rear side of the first reinforce 18, the third reinforce 23 can support the side sill outer 24.

According to this embodiment, the fragile portions 27 are formed in the side sill 21 so that when the small-overlap frontal collision occurs, the side sill outer 24 and the side sill inner 25 are separated from each other from the fragile portions 27. Thus, the first reinforce 18 can be further bent outward to prevent the wheel 34 from intruding into the vehicle cabin.

According to this embodiment, the side sill outer 24 has a lower strength than the side sill inner 25 so that when the small-overlap frontal collision occurs, the side sill outer 24 can be deformed toward an outside of the vehicle, thereby preventing the wheel 34 from intruding into the vehicle cabin.

According to this embodiment, the second reinforce 22 has a lower strength than the third reinforce 23 so that when the small-overlap frontal collision occurs, the second reinforce 22 can be bent toward the outside of the vehicle, thereby preventing the wheel 34 from intruding into the vehicle cabin.

According to this embodiment, because the A-pillar reinforcing member 28 also serves as the second reinforce 22, the number of the components can be prevented from increasing due to adopting the disclosure.

Although the embodiment of the disclosure has been described heretofore, the disclosure is not limited to this embodiment but may be modified without departing from the subject matter of the disclosure. Moreover, the above-described modes may be combined with one another.

According to the embodiment of the disclosure, the first reinforce is disposed in the front end side of the side sill so that when the small-overlap frontal collision occurs, the front end of the side sill that is reinforced by the first reinforce comes into contact with the wheel, cracks the wheel, and divides the wheel outer member and the wheel inner member from each other. The wheel outer member is what is called a disk and includes the spokes and the outer peripheral surface of the rim of the wheel. The wheel inner member includes the rim and the inner flange of the wheel. Thus, the wheel outer member having a high strength is wholly or at least partly displaced outside the vehicle cabin, and the wheel inner member having a low strength is collapsed in the wheelhouse, thereby preventing the wheel from intruding into the vehicle cabin. Moreover, the rear portion of the first reinforce overlaps the second reinforce so that when the small-overlap frontal collision occurs, the second reinforce generates the moment to bend the first reinforce outward. Thus, with the portion of the side sill outer where the first reinforce is disposed being provided as the inclined plane, the wheel outer member can be slid along this inclined plane and reliably displaced outside the vehicle cabin so as to prevent the high-strength wheel outer member from intruding into the vehicle cabin. Furthermore, because the third reinforce is disposed on the rear side of the first reinforce, the third reinforce can support the side sill outer.

The invention claimed is:

1. A vehicle bodyside structure to be applied to a vehicle, the vehicle bodyside structure comprising:
   a side sill disposed on a rear side of a front tire of the vehicle, the side sill extending along a vehicle fore-and-aft direction;
   a first reinforce disposed in a front end side of the side sill, the first reinforce including:
      a front portion extending from an inner side to an outer side in a vehicle width direction; and
      a rear portion extending along the vehicle fore-and-aft direction;
   a second reinforce at least partly overlapping the rear portion of the first reinforce; and
   a third reinforce disposed with an entirety of the third reinforce on a rear side of the first reinforce,
   wherein the second reinforce overlaps a vicinity of a rear end of the rear portion of the first reinforce, and
   wherein the third reinforce is disposed such that a gap exists between a front end portion of the third reinforce and a rear end portion of the first reinforce.

2. The vehicle bodyside structure according to claim 1, wherein the side sill includes:
   a side sill outer;
   a side sill inner; and
   connections where the side sill outer and the side sill inner are connected with each other, and
   wherein the connections in a vicinity of a front end of the third reinforce are partly made fragile to form fragile portions.

3. The vehicle bodyside structure according to claim 1, wherein the side sill includes:
   a side sill outer; and
   a side sill inner, and
   wherein the side sill outer has a lower strength than the side sill inner.

4. The vehicle bodyside structure according to claim 1, wherein the second reinforce has a higher strength than the third reinforce.

5. The vehicle bodyside structure according to claim 2, wherein the second reinforce has a higher strength than the third reinforce.

6. The vehicle bodyside structure according to claim 3, wherein the second reinforce has a higher strength than the third reinforce.

7. The vehicle bodyside structure according to claim 1, wherein the second reinforce includes an A-pillar reinforcing member.

8. The vehicle bodyside structure according to claim 2, wherein the second reinforce includes an A-pillar reinforcing member.

9. The vehicle bodyside structure according to claim 3, wherein the second reinforce includes an A-pillar reinforcing member.

10. The vehicle bodyside structure according to claim 4, wherein the second reinforce includes an A-pillar reinforcing member.

11. The vehicle bodyside structure according to claim 5, wherein the second reinforce includes an A-pillar reinforcing member.

12. The vehicle bodyside structure according to claim 6, wherein the second reinforce includes an A-pillar reinforcing member.

13. The vehicle bodyside structure according to claim 1, wherein the first reinforce, the second reinforce and the third reinforce are disposed inside the side sill,
   wherein the side sill has a wall disposed at an end in the vehicle width direction, each of the first reinforce, the second reinforce and the third reinforce has a part adjacent to the wall of the side sill,
   wherein the third reinforce is adjacent to the first reinforce interposing the gap in the vehicle fore-and-aft direction, wherein at least a part of the second reinforce is adjacent to the rear end of the first reinforce in the vehicle width direction, and wherein inside the side sill, no reinforces are disposed between the front end portion of the third reinforce and the rear end portion of the first reinforce in the vehicle fore-and-aft direction, or between the front end portion of the third reinforce and a rear end portion of the second reinforce in the vehicle fore-and-aft direction.

14. The vehicle bodyside structure according to claim 1, wherein the first reinforce substantially has an L-shape.

15. The vehicle bodyside structure according to claim 1, wherein the first reinforce as a whole provides an inclined plane inclined rearward and outward in the vehicle width direction.

16. The vehicle bodyside structure according to claim 1, wherein an entirety of the second reinforce is overlapping with the first reinforce.

17. The vehicle bodyside structure according to claim 1, wherein the second reinforce is disposed outside the rear portion of the first reinforce in the vehicle width direction.

18. The vehicle bodyside structure according to claim 1, wherein a rear end of the first reinforce is aligned with a rear end of the second reinforce.

19. The vehicle bodyside structure according to claim 2, wherein the connections are partly made fragile to form fragile portions, and wherein the fragile portions are disposed to align with the gap between the first reinforce and the third reinforce.

20. The vehicle bodyside structure according to claim 18, wherein the front end of the third reinforce is separated from the rear end of the first reinforce in the vehicle fore-and-aft direction.

* * * * *